(No Model.)
H. S. BLACKMORE.
FILTER.
No. 520,293. Patented May 22, 1894.
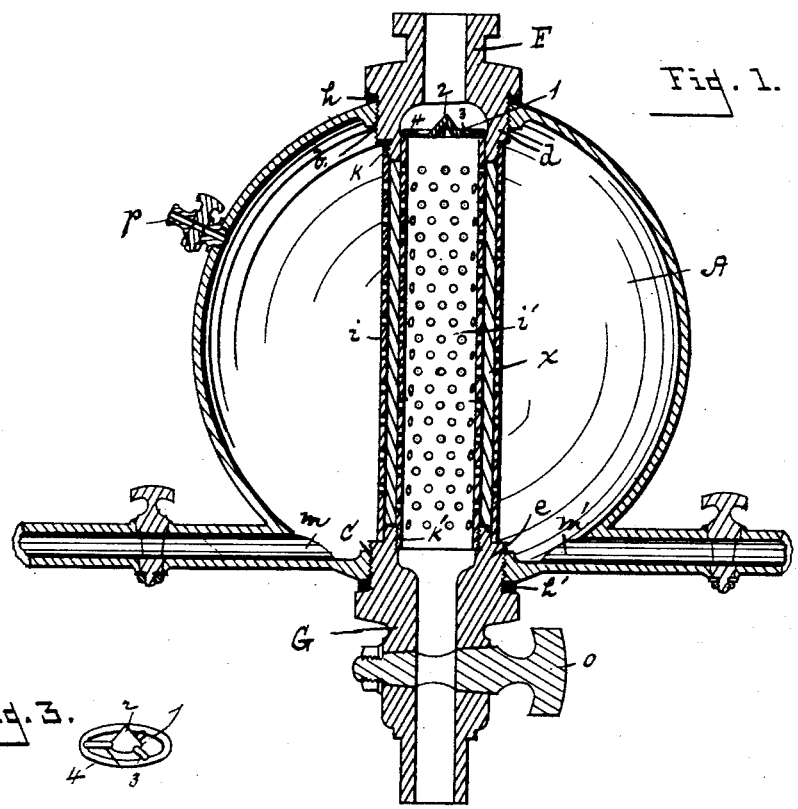
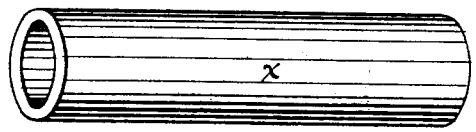
WITNESSES
H. N. Jenkins
C. F. Mallard
INVENTOR
Henry S. Blackmore
per Stoddart & Co.
Attorneys.

UNITED STATES PATENT OFFICE.

HENRY S. BLACKMORE, OF MOUNT VERNON, NEW YORK.

FILTER.

SPECIFICATION forming part of Letters Patent No. 520,293, dated May 22, 1894.

Application filed April 29, 1893. Serial No. 472,406. (No model.)

*To all whom it may concern:*

Be it known that I, HENRY S. BLACKMORE, a citizen of the United States, residing at Mount Vernon, in the county of Westchester and State of New York, have invented new and useful Improvements in Filters, of which the following is a specification.

This invention relates to an apparatus adapted to connect with a hydrant or other pipe through which water or other liquid is conveyed under pressure, so that the said liquid during its outward course, shall be thoroughly strained and filtered thereby.

My device is simple in construction, compact in form, and of low cost of manufacture, while at same time it is thoroughly effective in its operations, as well as self cleansing.

In the accompanying drawings Figure 1 is a vertical-longitudinal section of the filter;
Fig. 2 a perspective view of the filter tube adapted to fit between the perforated strainers of the device, and Fig. 3 a detail view, in perspective, of a deflector forming part of the apparatus.

The liquid reservoir A, is preferably made of spherical form with screw-threaded openings $b$, $c$, at opposite sides thereof for the reception of the threaded parts $d$ $e$, of pipe-couplings F G, under the collars of which are fitted one or more rubber, or other suitable washers $h$ $h'$, for insuring perfectly tight joints at the said points. The inner ends of the pipe couplings F, G, are somewhat reduced in diameter and one of the said pipe couplings, say F, has the outer diameter of its inner end, screw-threaded, while a screw-thread is cut within the said portion of the opposite coupling G, so that the perforated pipe-strainers $i$, $i'$, may be securely fitted to the said threaded portions, as shown at $k, k'$; the opposite ends of the said pipes $i$ $i'$ fitting, respectively, over or within the smooth parts of the pipe coupling-ends, as shown in Fig. 1. Within the enlarged recess of the pipe coupling F, is also fitted a deflector 1, which consists of a conical center piece 2, supporting-arms 3 and an annular-ring 4; the latter adapted to rest on the end of the inner-pipe $i'$, and thus support the deflector-proper 1, with its conical-point upward, or in the direction of the induction opening, for purposes hereinafter described. The lower part of the casing A is provided with one or more outlets $m$, $m'$, having suitable stop-cocks and pipes leading therefrom for the distribution of the filtered liquid as desired; and coupling G is furnished with a stop cock $o$, through which the accumulations of dirt, or foreign matter is discharged, when cleaning the apparatus.

The reservoir A is provided at a short distance above its center with a pet cock $p$, for regulating the escape of air therefrom.

In putting the apparatus together, the coupling F is held in an inverted position and the deflector 1, dropped, point-downward into the bottom thereof, the perforated pipes are next screwed to their respective pipe couplings, and then filter tube X which is composed of asbestus and fibrous material, slipped on the smallest pipe $i'$. The perforated pipes are then inserted, from opposite sides, into the reservoir and the pipe couplings screwed into their proper places, thus causing the smooth ends of the pipes to engage the smooth parts of the pipe couplings and be held by same, as required. The upper pipe coupling may be connected by any suitable-joint with a hydrant or other pipe, so that the water, or other liquid passing through same shall be forced through the strainers, and filtering-tube, leaving the sediment or foreign matter adhering thereto, or causing same to be precipitated to the lower pipe-coupling from whence it is withdrawn through the stop-cock thereof. During the flow of the liquid into the reservoir the pet-cock $p$ is kept open until the said liquid shall have reached the height of same; when it is closed, so that the liquid rising in the reservoir, shall in time be checked by the pressure of air above same, when further filtration ceases. The withdrawal of clear liquid reduces the air-pressure and thus the filtration begins anew.

To appreciate the value of this invention it should be borne in mind that as the pressure from the main-reservoir of city water-works is constantly varying, according to the height of water in same, so also the liquid in reservoir A varies in height, according to the pressure thus exerted; for instance, suppose the water to be under its greatest pressure, thus causing the air in reservoir A to be compressed to a given point, then as the pressure is reduced by the falling of water in the city reservoir, the air in reservoir A expands and forces a portion of the filtered water from said reservoir back into the supply tube, thus liberating or loosening any dirt or foreign matter which may have been held against the filtering material from the inside and cause same to fall to the lower part of the apparatus from whence it is discharged through the stop-cock o. Upon opening the stop-cock o, the same operation takes place, the pressure from the interior being thus reduced the compressed air in the reservoir A expands and likewise loosens the adhering matter at the inside of the strainers, or filtering tube, leaving same to be washed out by the flow of water through same.

Having described my invention, what I claim as new, and desire to secure by Letters Patent, is—

1. The combination in a filter, of a pair of pipe-couplings, and perforated straining-pipes of different diameters, connecting said pipe-couplings, a filtering tube arranged between the straining-pipes, and a stop-cock fitted in the lower pipe-coupling, so that the interior of the device may be thoroughly cleaned, by allowing the water to flow directly through the same, as described.

2. In a filter, a liquid-reservoir having screw-threaded openings in the upper and lower extremities thereof, and pipe-couplings fitted in said openings, with perforated-pipes, of different diameters, connected with the inner-ends of the pipe-couplings, and a tube of asbestus and fibrous material arranged between the perforated pipes, substantially as and for the purpose specified.

3. In a filtering-apparatus, the combination of a spherical liquid-reservoir having pipe-couplings fitted in the upper and lower extremities thereof, and straining-pipes connected with the inner-ends of the pipe-couplings, as described, a tube of filtering material arranged between the straining-pipes, the lower pipe-coupling provided with a stop-cock, the liquid-reservoir provided near its top with a pet-cock, and at its bottom with outlet-pipes, substantially as and for the purpose set forth.

4. The combination in a filtering-device, of a liquid-reservoir provided with inlet and outlet pipe-couplings, straining-pipes connected with the pipe-couplings, a filtering-tube located between the straining-pipes and a conical-deflector arranged within the inlet pipe-coupling, as described, so as to direct the inflowing liquid against the inner surface of the inner straining-pipe, substantially as and for the purpose specified.

In testimony whereof I affix my signature in presence of two witnesses.

HENRY S. BLACKMORE.

Witnesses:
I. BLACKMORE,
W. H. BARD.